(No Model.) 3 Sheets—Sheet 1.

A. TRAVIS.
MACHINE FOR COLORING SKINS.

No. 441,991. Patented Dec. 2, 1890.

Witnesses
Samuel Ker.
Wm. Bagger.

Inventor
Albertus Travis,
By his Attorneys.
C. A. Snow & Co.

(No Model.) 3 Sheets—Sheet 2.
A. TRAVIS.
MACHINE FOR COLORING SKINS.
No. 441,991. Patented Dec. 2, 1890.
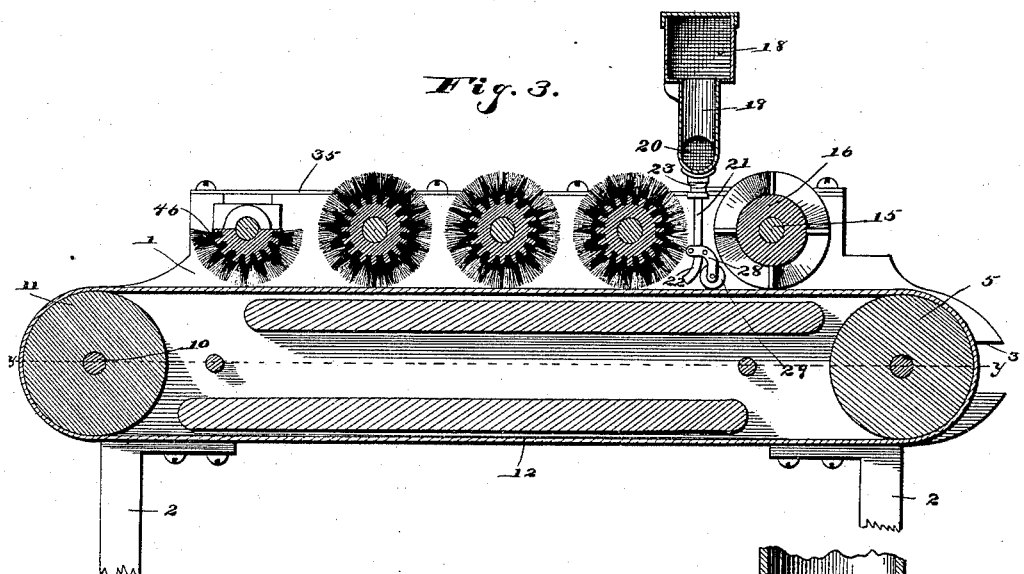
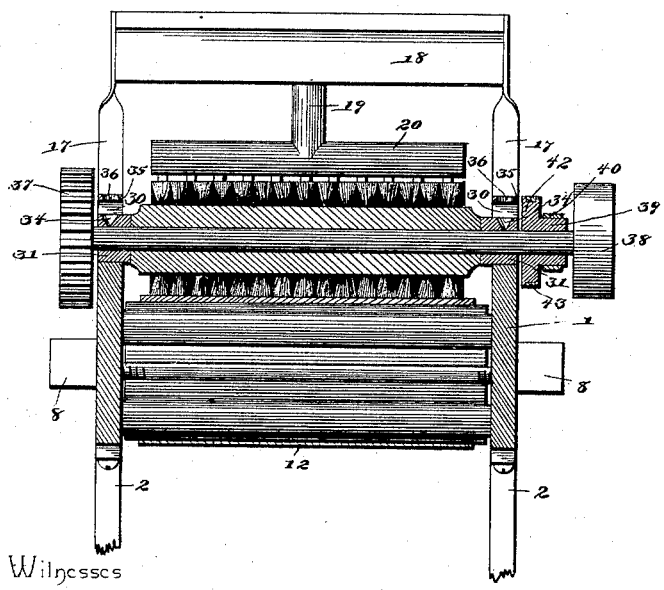
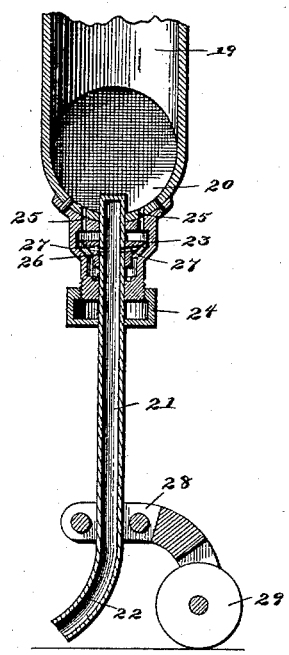
Witnesses
Samuel Ker.
Wm. Bagger.
Inventor
Albertus Travis.
By his Attorneys,
C. A. Snow & Co.

(No Model.) 3 Sheets—Sheet 3.

A. TRAVIS.
MACHINE FOR COLORING SKINS.

No. 441,991. Patented Dec. 2, 1890.

Witnesses
Samuel Ker.
Wm. Bagger.

Inventor
Albertus Travis.
By his Attorneys,
C. A. Snow & Co.

UNITED STATES PATENT OFFICE.

ALBERTUS TRAVIS, OF GLOVERSVILLE, NEW YORK.

MACHINE FOR COLORING SKINS.

SPECIFICATION forming part of Letters Patent No. 441,991, dated December 2, 1890.

Application filed April 10, 1890. Serial No. 347,403. (No model.)

*To all whom it may concern:*

Be it known that I, ALBERTUS TRAVIS, a citizen of the United States, residing at Gloversville, in the county of Fulton and State of New York, have invented a new and useful Machine for Coloring Skins, of which the following is a specification.

This invention relates to machines for coloring skins; and it has for its object to provide a machine of this class by means of which skins intended to be used for gloves and for other like purposes may be colored more quickly and evenly than has been done by such means as have heretofore been available for the purpose.

The invention comprises an endless carrier, to which the skins may be attached for operation and which is combined with a roller having flanges of peculiar construction for the purpose of smoothing the skins previous to receiving the coloring-matter, a tank and mechanism for delivering the fluid coloring-matter from the same to the skins, and mechanism for automatically stopping the flow of said coloring-matter, except at points where the skins are passing under the delivery-tubes, and a series of revolving cylindrical brushes serving to distribute the coloring-matter over the surface of the skins smoothly and evenly.

The invention further consists in the improved construction, arrangement, and combination of the detailed parts of the invention, which will be hereinafter fully described, and particularly pointed out in the claims.

Figure 1:
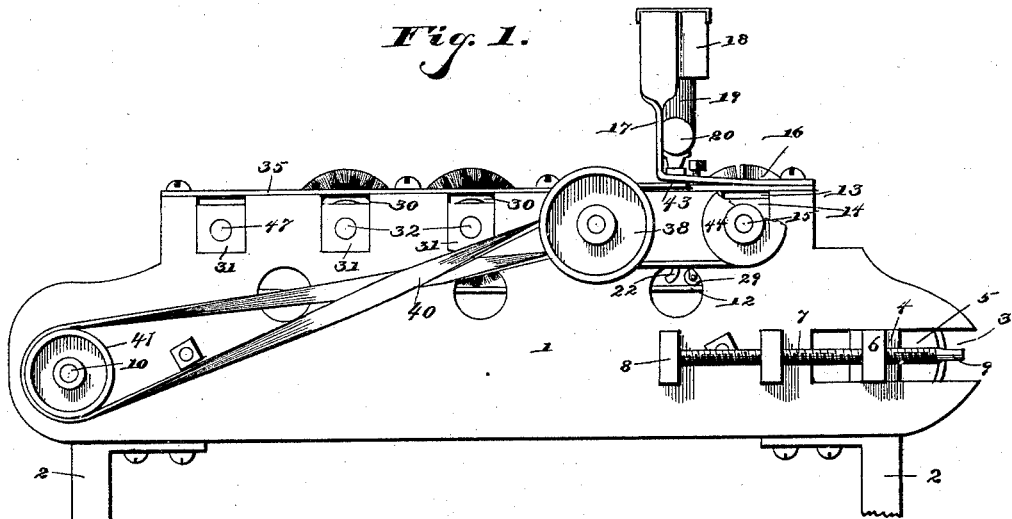
Figure 2:
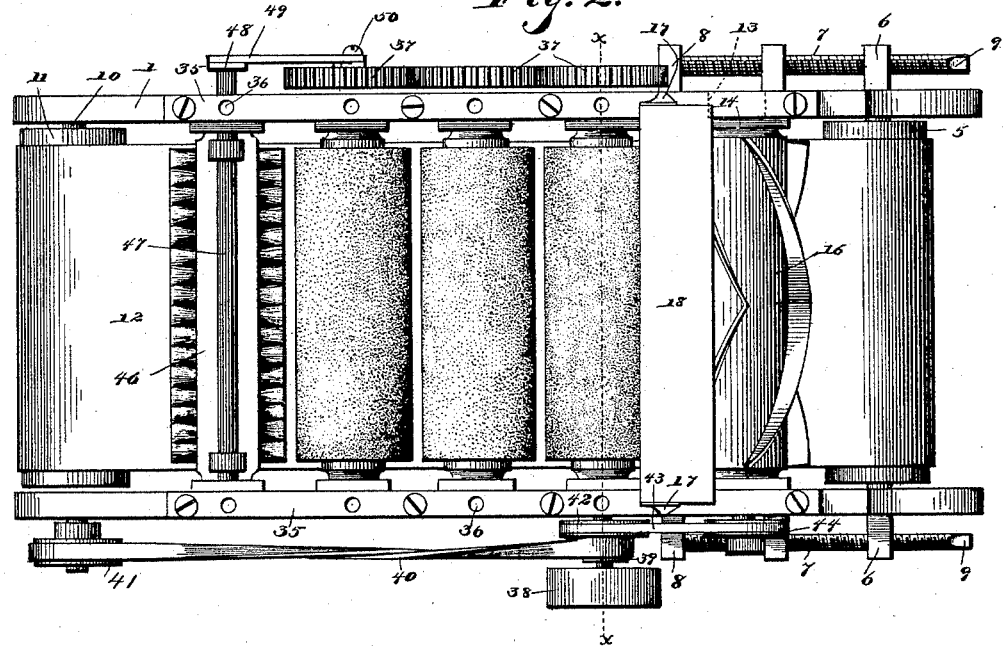
Figure 7:
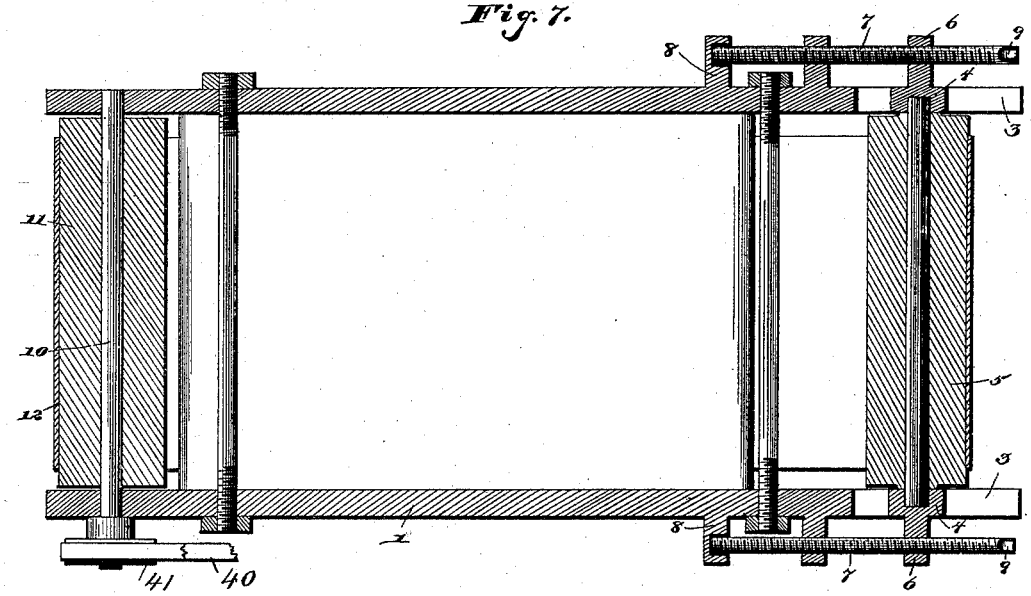
Figure 6:
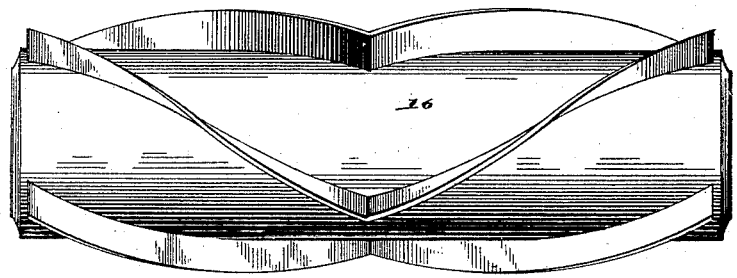

In the drawings, Figure 1 is a side view of a machine embodying my improvements. Fig. 2 is a plan view of the same. Fig. 3 is a longitudinal vertical sectional view of the same. Fig. 4 is a vertical transverse sectional view taken on the line $x$ $x$ in Fig. 2. Fig. 5 is a sectional detail view, on a larger scale, taken through the supply-tank and one of the valved delivery-pipes. Fig. 6 is a detail view of the smoothing-roller. Fig. 7 is a horizontal sectional view taken on the line $y$ $y$ in Fig. 3.

Like numerals of reference indicate like parts in all the figures.

1 designates a suitably-constructed rectangular frame, which is mounted upon legs or supports 2 2, and at the front end of which is formed horizontal slots 3, forming bearings for a pair of longitudinally-sliding boxes 4, in which is journaled the shaft of a roller 5. The blocks 4 4 are provided with laterally-extending lugs 6, having screw-threaded openings to receive the adjusting-screws 7, the rear ends of which are swiveled in brackets 8, extending laterally from the sides of the frame of the machine. The front ends of the screws 7 have wrench-seats 9, adapted to receive a key or wrench, by means of which they may be conveniently manipulated to effect a longitudinal adjustment of the blocks 4. The rear ends of the sides of the frame are provided with bearings for a transverse shaft 10, carrying a roller or cylinder 11. An endless apron 12 is mounted upon the rollers or cylinders 5 and 11, and it will be seen that by manipulating the screws 7 the roller 5 may be readily adjusted so as to strain the said apron to any desired degree of tension. The dimensions of the endless apron 12 should be such as to enable it to carry any desired number of skins which may be attached thereto for operation in any suitable manner.

The sides of the frame are provided near their front with vertical recesses 13, (see Fig. 1,) in which are mounted the blocks or boxes 14, having bearings for a transverse shaft 15, which carries the smoothing-roller 16. The latter is provided with a series of flanges which are angular or V-shaped, as will be clearly seen in Fig. 5 of the drawings. These flanges, which may be secured in any suitable manner to the face of the roller, diverge from the center in an upward and forward direction. The ends of said roller and said flanges serve during the operation of the machine to smooth the skins which have been attached to the endless apron when the said skins pass under the said smoothing-cylinder. The latter, it will be observed, is so arranged that the edges of the flanges will normally bear lightly against the surface of the apron. When the skins pass under the cylinder, the boxes in which the shaft of the latter is mounted will yield in an upward direction, so as to permit the skin to pass under the said roller without danger of being injured in the slightest degree. The said roller, as is obvious, should be made sufficiently heavy to perform its function of smoothing the skins thoroughly and efficiently. At the same time it must be light enough to avoid danger of injuring the skins.

Suitably attached to the upper edges of the sides of the frame are L-shaped brackets 17, the upper ends of which support a trough or tank 18. The latter is provided with a downwardly-extending escape-tube 19, having a transverse branch or termination 20, which extends across the entire width of the machine, and is provided with a series of downwardly-extending delivery-tubes 21, the lower ends of which are bent or curved, as will be seen at 22. The said delivery-tubes are mounted to slide vertically in valve-chambers 23 upon the under side of the branch pipe 20, said valve-chambers being provided with packing-glands, 24 in order to make tight joints. The valve-chambers are connected by perforations or passages 25 with the branch pipe 20 to afford access of the contents of the latter to the said valve-chambers. The delivery-tubes, or "inking-tubes," as I prefer to call them, are closed at their upper ends, and are provided with valves 26, seated in the valve-chambers 23 and provided with perforations 27, which when the said tubes are raised so as to raise the valves from their seats permit the fluid contents of the valve-chambers to pass into the inking-tubes. Clamped adjustably upon the latter, near their lower ends, are the brackets 28, in which wheels or rollers 29 are journaled. The latter are adapted to ride upon the endless apron and over the skins attached to the latter, and are so adjusted that when they come in contact with the skins they shall serve to raise the inking-tubes 21 slightly, thus permitting the liquid coloring-matter to flow through the latter. As soon as the rollers 29 pass out of contact with the skins the inking-tubes by their own weight will drop, thereby closing the valves and stopping the flow of the liquid.

It is obvious that the valve-chambers carrying the inking-tubes may be attached directly to the tank 18, of which the delivery-pipe 19 and branch 20, in fact, form a part; but I prefer the construction herein described, as insuring a more even and efficient distribution of the coloring-matter, and because any sediment that may be found therein is given an opportunity to settle in the tank 18, instead of entering the inking-tubes.

The front ends of the L-shaped brackets 17 are attached to the upper edges of the sides of the frame in such a manner as to permit the rear ends of said brackets carrying the apron mechanism to be raised or lifted whenever desired for the purpose of throwing the said inking mechanism out of operation. The sides of the frame are provided in rear of the inking mechanism with vertical slots or recesses 30 30, in which are mounted vertically-sliding blocks or boxes 31, forming bearings for the shafts 32 of the cylindrical brushes 33.

Said blocks or boxes are provided in their upper sides with lubricating-openings 34. To the upper edges of the sides of the frame are secured straps 35, which serve to retain the said sliding boxes in their respective recesses, and said straps are provided with perforations 36, registering with the lubricating-openings 34, in order to enable convenient access to be had to the latter. Each of the shafts 32 of the revolving cylindrical brushes is provided at one end with a gear-wheel or pinion 37. The several pinions mesh with each other, thereby causing the series of cylindrical brushes, of which any desired number may be used, to rotate in opposite direction. A shaft of one of said brushes is provided at its opposite end with a band-wheel 38, adapted to receive motion from driving machinery of any suitable kind. The same shaft is also provided with a drum 39, connected by a belt or band 40 with a band-wheel 41 upon the shaft of the rear roller 11 of the endless apron 12, to which motion is in this manner communicated. The shaft of the cylindrical brush having the band-wheel 38 is also provided with a pulley 42, connected by an endless belt 43 with a pulley 44 upon one end of the shaft of the smoothing-cylinder, to which motion is thus transmitted. The belt or band 40 is twisted, as shown, in order to cause motion to be transmitted in the proper direction.

In addition to the revolving cylindrical brushes just described, I provide another semi-cylindrical brush 46, mounted upon a shaft 47, in two of the blocks or boxes 31. The end of the shaft 47 has a crank 48, which is connected by a pitman 49 with a wrist-pin 50 upon one of the pinions 37. From the latter an oscillating motion will thus be transmitted to the shaft carrying the semi-cylindrical brush, which will thus be caused to operate more efficiently than by a simple rotary motion.

The operation and advantages of my invention will be readily understood from the foregoing description, taken in connection with the drawings hereto annexed. The skins which are to operated upon are attached in any suitable manner to the endless apron 12, which latter is arranged to be operated at a considerably slower rate of speed than the smoothing-roller and the revolving cylindrical brushes. As the skins pass under the smoothing-roller they are pressed out smoothly and flatly upon the carrying-apron, and when they pass under the inking-tubes the latter will be raised or elevated by the skins coming in contact with the rollers 29 at their lower ends, thus opening the valves and causing the coloring-fluid to be deposited upon the skin. During the passage of the skin under the revolving cylindrical brushes the latter serve to effectually distribute the coloring-matter, as will be readily understood.

The general construction of my invention is simple and inexpensive, and it is durable, conveniently manipulated, and exceedingly efficient in operation.

I would have it understood that while I have herein described what I consider to be the preferred construction of my invention I do not limit myself to the precise details of construction herein set forth, but reserve the right to any changes and modifications which may be resorted to without departing from the spirit of my invention.

What I claim is—

1. The combination, with a suitable frame, of an endless apron adapted to carry the skins, a vertically-movable roller arranged above said apron and having V-shaped flanges diverging from the center to the ends of said roller and adapted to bear against and to smooth the skins passing under the same, the ink-supplying devices arranged in rear of said smoothing-roller, and a series of oppositely-revolving cylindrical brushes arranged above the apron in rear of the ink-supplying devices, substantially as set forth.

2. The combination, with the endless carrying-apron, of the ink-tank, the vertically-movable valved inking-tubes, the vertically-adjustable brackets at the lower ends of the latter, having wheels or rollers journaled therein, the oppositely-revolving cylindrical brushes, and suitable operating mechanism, substantially as set forth.

3. The combination, with the endless carrying-apron, of the ink-tank, the vertically-movable valved inking-tubes having wheels or rollers at their lower ends, the brushes, and suitable operating mechanism, substantially as and for the purpose set forth.

4. The combination, with the frame having the endless carrying-apron, the flanged smoothing-roller mounted in vertically-adjustable boxes or bearings, and the brushes, of the L-shaped brackets hinged to the upper edges of the frame, the inking mechanism attached to said brackets, and mechanism for automatically regulating the flow of the ink or liquid coloring-matter, substantially as herein set forth.

5. The combination of the endless apron, the vertically-adjustable smoothing-roller, the supply-tank, the vertically-movable valved inking-tubes having vertically-adjustable brackets carrying rollers adapted to bear against the skins attached to the endless carrying-aprons, and a series of oppositely-revolving cylindrical brushes, substantially as and for the purpose herein set forth.

6. In a machine for coloring skins, the combination of a suitable frame, the endless carrying-apron, the vertically-movable boxes, the shafts mounted in said boxes and carrying a flanged pressure-roller and a series of oppositely-revolving cylindrical brushes, the inking-tank arranged intermediately between the pressure-roller and the adjacent cylindrical brush and having mechanism for delivering the coloring-matter to the skins attached to the endless carrying-apron and for automatically controlling the delivery of said coloring-matter, and suitable operating mechanism, substantially as set forth.

7. In a machine for coloring skins, the combination of a series of cylindrical brushes, mechanism for rotating said brushes in opposite directions, a shaft mounted to rock or oscillate in its bearings and carrying a brush, a pitman connecting a crank on said rock-shaft with a wrist-pin upon the spur-wheel of the adjacent revolving shaft, an endless carrier, means for applying fluid coloring-matter to skins mounted upon or attached to said endless carrier, and suitable operating mechanism, substantially as described.

In testimony that I claim the foregoing as my own I have hereto affixed my signature in presence of two witnesses.

ALBERTUS TRAVIS.

Witnesses:
 JOHN KENNEDY,
 MICHEL KENNEDY.